United States Patent [19]
Fukui et al.

[11] Patent Number: 5,313,297
[45] Date of Patent: May 17, 1994

[54] SYSTEM FOR PROVIDING PICTURES RESPONDING TO USERS' REMOTE CONTROL

[75] Inventors: Satoshi Fukui, Osaka; Masato Hata, Toyonaka, both of Japan

[73] Assignee: Costem Inc., Japan

[21] Appl. No.: 856,670

[22] Filed: Mar. 24, 1992

[30] Foreign Application Priority Data

Sep. 19, 1991 [JP] Japan .................... 3-84425

[51] Int. Cl.$^5$ .................. H04H 1/08; H04M 11/00
[52] U.S. Cl. ........................ 348/7; 358/335; 379/90; 348/12
[58] Field of Search ............ 358/83, 84, 85, 86, 358/93, 98, 335, 401; 379/90, 93, 96, 102

[56] References Cited

U.S. PATENT DOCUMENTS

| | | | |
|---|---|---|---|
| 4,450,477 | 5/1984 | Lovett | 358/86 |
| 4,734,764 | 3/1988 | Pocock et al. | 358/86 |
| 4,805,119 | 2/1989 | Maeda et al. | 364/518 |
| 5,060,068 | 10/1991 | Lindstrom | 358/185 |
| 5,093,718 | 3/1992 | Hoarty et al. | 358/84 |
| 5,200,993 | 4/1993 | Wheeler et al. | 358/442 X |

Primary Examiner—Bentsu Ro
Attorney, Agent, or Firm—Evenson, McKeown, Edwards & Lenahan

[57] ABSTRACT

A system for providing pictures responding to users' remote control is an system for providing digital picture signals of respective programs specified by operation signals from external communication lines. The system comprises a line control equipment for connecting each communication line to its corresponding internal signal line among plural internal signal lines, and plural picture providing equipments connected to the plural internal signal lines, respectively.

Each picture providing equipment comprises plural picture storing/reproducing equipments, an operation signal analysis equipment for analyzing the operation signals, and a picture output equipment for making the picture storing/reproducing equipment storing the pictures of specified program output the picture signals of the program, to the line control equipment through the internal signal line.

5 Claims, 1 Drawing Sheet

SYSTEM FOR PROVIDING PICTURES RESPONDING TO USERS' REMOTE CONTROL

BACKGROUND OF THE INVENTION

The present invention relates to a system for providing pictures responding to users' remote control, and more particularly a system for transmitting digital picture data of pictures of one or plural items to external communication lines individually, according to operation signals inputted by users and transmitted to the system through the communication lines, as command signal for specifying the pictures and setting the operation mode of picture reproducing equipments storing picture signals of the pictures.

Television and cable television have been put to practical use as systems capable of providing various kinds of moving pictures to distant areas through the communication lines.

Since the television broadcasting stations only provide their programs uniformly over the country, users can not watch pictures of their desirous category, such as movies, sports, news, etc., whenever they want. On the other hand, the cable television has been widely spreading, particularly in U.S.A. Since there are provided many cable television broadcasting channels, each of which provides a program of a specific category, users can select their desirous program. However, to enjoy watching the cable television program, users have to run a communication cable, and pay its expensive subscription and service fee. In addition, in the early stage a few cable television channels are available, the users can not watch their desirous program whenever they want, much less their favorite pictures of one or more items. (for example, movies, sports, news, etc.)

SUMMARY OF THE INVENTION

An object of the present invention is to provide a system for providing pictures responding to users' remote control through communication lines, individually, in accordane with remote control of the operation signals from users.

The system according to the present invention comprises a line control equipment for connecting each communication line to its corresponding internal signal line among plural internal signal lines, and plural picture providing equipments connected to the plural internal signal lines, respectively.

Each picture providing equipment comprises plural picture storing/reproducing equipments, each of which includes picture storage media storing picture signals of program including pictures of one or plural items and is capable of outputting the picture signals, an operation signal analysis equipment for analyzing the operation signals, and a picture output equipment for making the picture storing/reproducing equipment storing the pictures of specified program output the picture signals of the program, to the line control equipment through the internal signal line.

DETAILED DESCRIPTION OF PREFERRED EMBODIMENT

Figure 1:
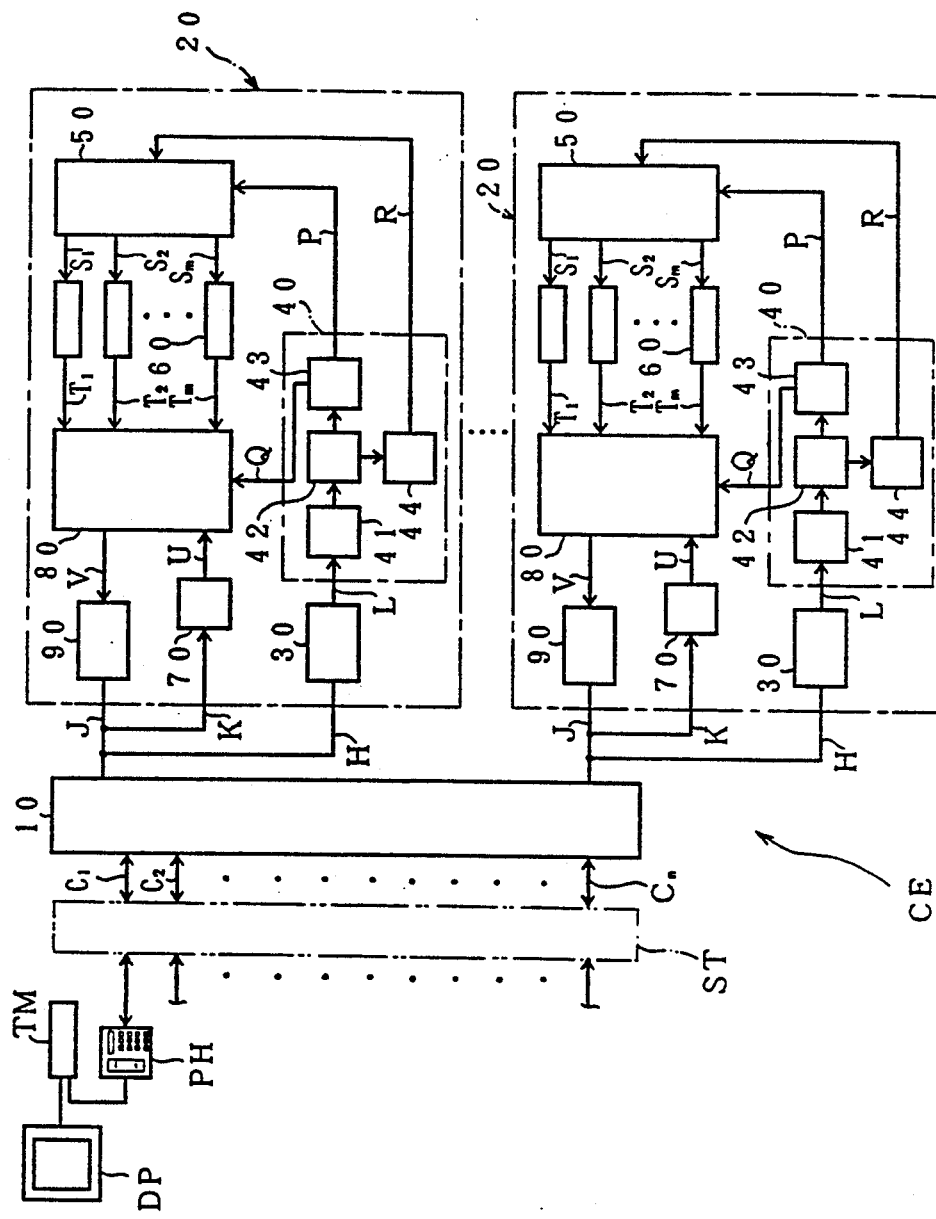
FIG. 1 is a diagram showing a configuration of a system for providing pictures responding to users' remote control.

Hereinafter, a preferred embodiment of the present invention will be described with reference to the accompanying drawing.

A central system is for providing various picture information and various moving pictures to large numbers of unspecified users through ISDN (Integrated Services Digital Network) lines. The central system is owned by an enterpriser doing business of providing picture information and moving pictures and is installed in his office building.

As shown in FIG. 1, the central system CE comprises, a line control equipment 10, to which n ISDN lines $C_1 \sim C_n$ are connected, and n sets of program providing equipments 20, corresponding to the ISDN lines $C_1 \sim C_n$, respectively.

The line control equipment 10 is equivalent to a private branch exchange (PBX) and is connected to each program providing equipment 20 through internal signal lines H.K.J. The line control equipment 10 executes receiving and transmitting controls for the ISDN lines $C_1 \sim C_n$. When telephone calls through the ISDN lines $C_1 \sim C_n$ are received, the line control equipment 10 outputs display command signals to the guide picture equipments 70 of the program providing equipments 20, respectively. Here, it is assumed that users own a telephone PH of push-button type, a picture display terminal equipment TM, and a picture display equipment DP. In FIG. 1, a designation ST indicates a telephone exchange station. Each program providing equipment 20 comprises, a DTMF signal (telephone signal) conversion device 30, a picture switching control unit 40, a control signal switching equipment 50, m sets of picture reproducing equipments 60, a guide picture equipment 70, a picture switching equipment 80, and a picture coding equipment 90.

The DTMF signal conversion device 30 includes a conversion circuit for converting analog DTMF signals generated by pushing the buttons of the telephone PH, into digital DTMF signals, and its accessory circuits connected to it. The conversion device 30 is connected to a command buffer 41 of the picture switching control unit 40 through an internal signal line L. In the state where respective telephone calls from the ISDN lines $C_1 \sim C_n$ are received, when respective users push the buttons of their telephone PH in predetermined sequence, each of the combination of the DTMF signals constitutes operation signals to be inputted to the DTMF signal conversion devices 30. The operation signals serve as command signals, by which respective users can specify one of n sets of programs that the central system CE provides and make the central system CE transmit its specified pictures to them through the ISDN lines $C_1 \sim C_n$, individually, or can operate the picture reproducing equipments 60 in various operation modes, such as playback, forwarding, rewinding. The operation signals are converted into command data by the DTMF signal conversion device 30, and then the command data are outputted to a command buffer 41 of the picture switching control equipment 40.

The picture switching control equipment 40 includes the command buffer 41, a command analysis device 42, a switching signal generation device 43, and a control signal generation device 44, which are interconnected each other, as shown in FIG. 1. The switching signal generation device 43 is connected to the control signal switching equipment 50 and the picture switching equipment 80 through internal signal lines P,Q, respectively. The control signal generation device 44 is connected to the control signal switching equipment 50 through an internal signal line R.

The command buffer 41 includes a random-access memory (RAM), and memorizes the command data from the DTMF signal conversion device 30, temporarily. The command analysis device 42 including an encorder reads the command data in sequence from the command buffer 41, and analyzes them, and then outputs the command data to the switching signal generation device 43 in case where the command data are for specifying the program, or outputs the command data to the control signal generation device 44 in case where the command data are for specifying the operation mode of the picture reproducing equipment 60.

The switching signal genaration device 43 including an encorder outputs switching control signals to the control signal switching equipment 50 and the picture switching equipment 80, respectively, on the basis of the command data from the command analysis device 42. The control signal generation device 44 including an encorder outputs an operation control signals to the control signal switching equipment 50, on the basis of the command data from the command analysis device 42.

The control signal switching equipment 50 includes switch circuit with plural analog switches, and connected to m sets of the picture reproducing equipment 60 through internal signal lines $S_1 \sim S_m$, respectively. The positions of the switches of the control signal switching equipment 50 are changed by the switching control signals from the switching signal generation device 43, and therefore the operation control signals are inputted selectively to the picture reproducing equipment 60 storing the program specified by the user.

M sets of the picture reproducing equipments 60 are connected to the picture switching equipment 80 through internal signal lines $T_1 \sim T_m$, respectively.

Each picture reproducing equipment 60 comprises storage media, such as optical disks (laser disks) or magnetic disks or magnetic tapes or semiconductor integrated circuits of large capacity, and a reproducing device for reproducing pictures and audio music stored in the storage media. In the storage media of each picture reproducing equipment 60, a program of a specific category, such as, plural rolls of movies, plural matches of sports, plural items of news, or various kinds of music including pictures, is stored, and each picture reproducing equipment 60 is controlled by the operation control signals and the reproduced picture signals including audio signals are outputted to the picture switching equipment 80.

The guide picture equipment 70 includes a microcomputer having a central processing unit (CPU), a read-only memory (ROM), a random-access memory (RAM), and an input/output interface (I/O), and connected to the picture switching equipment 80 through an internal signal line U. In the ROM of the guide picture equipment 70, guide picture data of guide pictures to be displayed on the picture display equipment DP and guide voice data of guide voice to be outputted from loudspeakers of the picture display eqipment DP are stored. The guide pictures are, for example, a list of the combinations of the buttons of the telephone PH corresponding to the programs, respectively, titles and outline contents of respective programs, and an explanation of how to operate the picture reproducing equipment 60. The guide voice are, for example: "Please specify your request program by pushing telephone buttons." and "After specifying the program, please specify playback mode by pushing telephone buttons."

According tot he display command signal inputted to the guide picture equipment 70 form the line control equipment 10 when the telephone calls through the ISDN lines $C_1 \sim C_n$ are received, the guide picture data and guide voice data are read from the ROM, and these data are converted into the guide picture signals and guide voice signals, respectively, and then outputted to the picture switching equipment 80. Here, it is assumed that the program can be specified by pushing three telephone buttons in sequence and the operation mode of the picture reproducing equipment 60 can be specified by pushing two telephone buttons in sequence. For example, 「1」, 「0」, 「1」 specifies movie program and 「1」, 「0」, 「2」 specifies sports program. Also, 「#」, 「1」 specifies playback mode and 「#」, 「2」 specifies forwarding mode.

The picture switching equipment 80 includes plural switches such as analog switches, and signal distribution devices. The picture switching equipment 80 is connected to the picture coding equipment 90 through an internal signal lines V. On the basis of the switching control signals from the switching signal generation device 43, the positions of switches of the picture switching equipment 80 are changed so as to output the program specified by the user to the picture coding equipment 90. It is assumed that, in the initial state, the switches of the picture switching equipment 80 are in positions for outputting the guide picture signals and guide voice signals from the guide picture equipment 70 to the picture coding equipment 90.

The picture coding equipment 90 includes a prediction circuit, a quantization circuit, and a coding circuit. The picture coding equipment 90 converts the picture signals into the compressed digital picture data by coding, and then transmits the picture data to the ISDN lines $C_1 \sim C_n$ through the line control equipment 10. It is assumed that a decoding circuit for converting the compressed picture data into its original picture signals, a digital-to-analog conversion circuit, and an amplifier are provided in the picture display terminal equipment TM.

Next, the function of the central system CE constituted as above-described will be explained.

The user, who wants to watch the pictures of his desirous program, makes a telephone call to the central system CE, and when his call is received to the line control equipment 10, the line control equipments 10 output the display command signals to the guide picture equipment 70.

Next, according to the display command signals, the guide picture equipment 70 outputs the guide picture signals and guide voice signals to the picture switching equipment 80, and these signals are transmitted to the ISDN line through the picture coding equipment 90, therefore the guide pictures are displayed on the picture display equipment DP, with the guide voice from its loudspeakers.

Next, when the user specifies program he wants to watch while watching the guide pictures, by pushing the telephone buttons, for example, 「1」, 「0」, 「1」 in sequence, and then specifies playback mode by pushing the telephone buttons 「#」, 「1」 in sequence, the operation signals constituted with these DTMF signals is inputted to the DTMF signal analysis device 30, and converted into the command data by the device 30, then the command data is outputted to the command buffer 41 and stored in it, temporarily.

Next, the command data specifying the program are read from the command buffer 41 and analysed by the command analysis device 42, and then the command data are outputted from the command analysis device 42 to the switching signal generation device 43. Then, according to the command data, the switching control signals are outputted to the control signal switching equipment 50 and the picture switching equipment 80, respectively. On the basis of the switching control signals, the positions of switches of the control signal switching equipment 50 are changed so as to transmit the operation control signals from the control signal generation device 44 to the picture reproducing equipment 60 which stores the program specified by users, and the positions of switches of the picture switching equipment 80 are changed so as to transmit the picture signals of the specified program to the corresponding ISDN line through which the operation signals is transmitted.

Next, the command data specifying the operation mode are read from the command buffer 41 and analyzed by the command analysis device 42, and then the command data are outputted from the command data analysis device 42 to the control signal generation device 44. Then, the operation control signals are outputted to the control signal switching equipment 50, and then outputted through the switch of the control signal switching equipment 50 to the picture reproducing equipment 60 which stores the program specified by the user, and the picture reproducing equipment 60 is operated in the specified mode by the operation control signals. The picture signals from the picture reproducing equipment 60 are outputted to the picture coding equipment 90 through the switch of the picture switching equipment 80, and are converted into the picture data by the picture coding equipment 90, and then transmitted to the corresponding ISDN line.

In the state where the program is transmitted, when the user puts the receiver to the telephone console, the ISDN line is disconnected and the transmission of the program is ended.

The user can change the program to be transmitted or change the operating mode of the picture reproducing equipment 60, for example, forwarding or rewinding, by pushing the telephone button, even if the previous program is being transmitted.

In this way, since the central system CE includes plural picture providing equipment 20 corresponding to the plural ISDN lines $C_1 \sim C_n$, the central system CE can transmit the digital picture signals of each program including one or plural items to the ISDN lines $C_1 \sim C_n$, respectively, according to the operation signals. The users, therefore, can select and operate one of the plural picture reproducing equipment 60 of the picture providing equipment 20, and can enjoy watching their desirous program including one or plural items (or titles), whenever they want.

What is claimed is:

1. A system for providing pictures responding to users' remote control which is connected to plural external communication lines and provides digital signals of pictures of respective programs specified by operation signals transmitted through said communication lines, individually, in accordance with remote control by the operation signals, said system comprising;

line control means for connecting the communication line through which the operation signals are transmitted, to its corresponding internal signal line among plural internal signal lines corresponding to the plural communication lines, respectively; and plural picture providing means connected to the plural internal signal lines, respectively; each of which comprises;

plural picture storing/reproducing means, each of which includes picture storage media storing picture signals of a program including pictures of one or plural items, and is capable of reproducing the picture signals;

operation signal analysis means for analyzing the operation signals inputted to the internal signal line and then outputting control signals including signals for specifying one of the picture storing/reproducing means and signals for operating it; and picture output means for making the picture storing/reproducing means storing the pictures of specified program, outputting the picture signals of the program on the basis of the operation signals, and then converting the picture signals into digital picture data, and then outputting the digital picture data to the line control means through the internal signal line.

2. A system according to claim 1, wherein each of said picture providing means comprises switching means for receiving the control signals and then outputting the control signals to the picture storing/reproducing means which stores the pictures of the specified program.

3. A system according to claim 2, wherein each of said picture providing means comprises picture coding means for converting the picture signals from the picture storing/reproducing means, reproducing according to the control signals into digital picture data, and then outputting them to the internal signal line.

4. A system according to claim 1, wherein said picture storing/reproducing means comprises storage media storing the picture signals of a program including pictures of one or plural items.

5. A system according to claim 1, wherein said external communication lines are constituted with Integrated Services Digital Network (ISDN) communication lines.

* * * * *